US007445267B2

(12) United States Patent
Charon et al.

(10) Patent No.: US 7,445,267 B2
(45) Date of Patent: Nov. 4, 2008

(54) HINGE DEVICE WITH A PISTON/CYLINDER UNIT

(75) Inventors: Jean-Noél Charon, Koblenz (DE); Rolf Mintgen, Thuer (DE)

(73) Assignee: Stabilus GmbH, Koblenz (DE)

( * ) Notice: Subject to any disclaimer, the term of this patent is extended or adjusted under 35 U.S.C. 154(b) by 206 days.

(21) Appl. No.: 11/496,694

(22) Filed: Jul. 31, 2006

(65) Prior Publication Data

US 2007/0035149 A1 Feb. 15, 2007

(30) Foreign Application Priority Data

Aug. 1, 2005 (DE) ........................ 10 2005 036 596

(51) Int. Cl.
*B60J 5/00* (2006.01)

(52) U.S. Cl. .............................. 296/146.11; 296/146.1; 296/146.8

(58) Field of Classification Search .............. 296/146.1, 296/147, 146.8, 146.11, 146.12; 16/66, 68, 16/70, 50, 221; 49/236
See application file for complete search history.

(56) References Cited

U.S. PATENT DOCUMENTS

| | | | | |
|---|---|---|---|---|
| 6,182,952 | B1 * | 2/2001 | Gutierrez | 49/260 |
| 6,550,839 | B2 * | 4/2003 | Rogers et al. | 296/146.8 |
| 7,017,973 | B2 * | 3/2006 | Sera et al. | 296/146.1 |
| 2002/0195841 | A1 | 12/2002 | Eberle | |

FOREIGN PATENT DOCUMENTS

| | | |
|---|---|---|
| DE | 94 11 745.4 | 9/1994 |
| EP | 1 260 426 A2 | 11/2002 |

* cited by examiner

*Primary Examiner*—Lori L Lyjak
(74) *Attorney, Agent, or Firm*—Cohen Pontani Lieberman & Pavane LLP

(57) ABSTRACT

A hinge device for a flap of a motor vehicle includes a piston/cylinder unit arranged between a fixed structural part and a first flap which is pivotable about an axis of rotation. A second flap is likewise pivotable about the axis of rotation and can be connected releasably to the first flap. The piston/cylinder unit is arranged between a first leg, firmly connectable to the fixed structural part, and a second leg carrying the first flap, of a hinge 6. A third leg carries the second flap, wherein the first leg, the second leg, and the third leg 9 are pivotably arranged on a common hinge axis of rotation.

27 Claims, 4 Drawing Sheets

HINGE DEVICE WITH A PISTON/CYLINDER UNIT

BACKGROUND OF THE INVENTION

1. Field of the Invention

The present invention relates to a hinge device for a flap of a motor vehicle, the hinge device having a piston/cylinder unit, i.e., a pneumatic spring, which has a pressure tube and a piston displaceable in the pressure tube and provided with a piston rod, the piston/cylinder unit being arranged between a fixed structural part and a first flap which is pivotable about an axis of rotation and to which a second flap likewise pivotable about the axis of rotation can be connected releasably.

2. Description of the Related Art

A hinge device of this type is generally known from an opening arrangement for a panel of a counter. In this case, the panel is fastened to a first spar which is mounted rotatably, in each case by means of a journal, on two supporting arms forming a parallelogram. Furthermore, each of the supporting arms is mounted rotatably on a lower bearing spar by means of a further journal. Via additional journals, a pneumatically actuated piston is tied both to the lower bearing spar and to one of the supporting arms. An opening of the panel takes place in response to a pressure exerted by the piston, the supporting arms being pivoted and the first spar connected to the supporting arms being offset, together with the panel.

Furthermore, a hinge device with a pivotable openable tailgate of a motor vehicle is known, the tailgate having a rear window to be opened independently of the tailgate and likewise pivotably. A pneumatic spring is provided in each case for opening both the tailgate and the rear window. Such a hinge device is not only cost-intensive, but also has a complicated construction because of the numerous fastening elements required.

Another known hinge device with an arrangement corresponding to the abovementioned tailgate/rear-window version provides the use of torsion-spring elements for opening the tailgate and rear window. In addition to inconvenient operation, this hinge device is highly cost-intensive.

SUMMARY OF THE INVENTION

An object of the present invention is to provide a hinge device for a flap of a motor vehicle, the hinge device having a piston/cylinder unit, i.e., a pneumatic spring, which has a pressure tube and a piston displaceable in the pressure tube and provided with a piston rod, the piston/cylinder unit being arranged between a fixed structural part and a first flap which is pivotable about an axis of rotation and to which a second flap likewise pivotable about the axis of rotation can be connected releasably, and which is constructed simply and can easily be mounted.

The object is achieved, according to an embodiment of the invention, in that a piston/cylinder unit is arranged between first and second legs of a hinge, the first leg firmly connectable to a fixed structural part and the second leg carrying the first flap, wherein the first leg, the second leg and a third leg are arranged pivotably on a common hinge axis of rotation, the third leg carrying the second flap.

The three legs, arranged on the common hinge axis, with the piston/cylinder unit arranged on them, form a premountable structural unit which is connectable as such to the fixed structural part without any appreciable outlay. Furthermore, by means of the hinge device according to an embodiment of the invention, it is possible in a simple way to move either both flaps together or only the first flap using only one piston/cylinder unit. The hinge device advantageously requires only a small installation space, and the number of structural parts required is low. This results not only in the capability of cost-effective production of the piston/cylinder unit, but also in high operating reliability and high durability. The present invention is consequently particularly suitable for use in articles exposed permanently to demanding loads and produced in large series, such as, in particular, motor vehicles. Further advantages of the hinge device of the present invention are low maintenance and low susceptibility to wear. The piston/cylinder unit advantageously comprises a pneumatic spring, in particular a pneumatic compression spring. Pneumatic springs can be produced comparatively cost-effectively in a high quality and in large quantities and have high operating reliability. A particular advantage of the invention is the low dead weight of the hinge device, this being manifested advantageously, above all, in a hinge device in a motor vehicle, since any weight reduction here not only leads to a lowering of the fuel consumption, but also helps to improve the driving behavior of the motor vehicle and reduces the production costs. A pivoting of a third leg may take place, for example, by connection to the second leg. The third leg may be connected to the second leg, for example, via a driver, in which case a freewheel stage may also be provided, as required. However, it is also conceivable, for example, to provide between the second and third leg a rigid connection which, for example in the form of a lock or a latch, is openable.

The stability of the hinge device is additionally increased and its construction further simplified when, according to an embodiment of the invention, the first leg is arranged firmly on the mount such as a fixed frame. The mount may, for example, be connected to a motor vehicle body so as to form a single structural part.

A particularly high load-bearing capacity of the hinge arrangement is achieved in that a fourth leg forms a second hinge with the third leg, the fourth leg being connectable firmly to the fixed structural part, and the first hinge and the second hinge being arranged pivotably on the common hinge axis of rotation.

The first flap may be a rear window and the second flap a tailgate of a motor vehicle.

In such a design, a damping property of the piston/cylinder unit and, moreover, its capability for moving the rear window and/or tailgate actively may advantageously be utilized.

The first flap is preferably connected via a releasable connection to the second flap such as by a lock.

The third leg could also be integrated into one hinge, in which case the hinge could have a common base, formed, for example, by the first leg, for two independent legs in the form of a second leg and of the third leg. However, a clear functional separation and consequently also an unequivocal force and torque assignment can be achieved if, according to another embodiment of the invention, a second hinge having the third leg is provided, and if the hinge axis of rotation of the first hinge and the hinge axis of rotation of the second hinge are arranged parallel to one another. The hinge axis of rotation of the second hinge corresponds to the pivot axis of the third leg. The hinge axis of rotation of the first hinge and the hinge axis of rotation of the second hinge preferably coincide.

The hinge device can have a particularly compact construction and, in particular, very small and/or very large hinge angles can be set if, according to another advantageous development of the invention, at least one of the legs has a perforation receiving at least part of the piston/cylinder unit.

According to another embodiment of the invention, a simple tie-up or connection of the piston rod directly to one leg or to the mount can be achieved in that the piston rod has, at its end facing away from the pressure tube, a piston-rod pivot bolt arranged perpendicularly with respect to the mid-axis of the piston/cylinder unit. The piston-rod pivot bolt is preferably arranged parallel to the hinge axis of rotation.

Furthermore, a simple tie-up of the pressure tube directly to one leg or to the mount can be achieved in that the pressure tube has, at its end facing away from the piston rod, a pressure-tube pivot bolt arranged perpendicularly with respect to the lid-axis of the piston/cylinder unit. The pressure-tube pivot bolt is preferably arranged parallel to the hinge axis of rotation.

According to an embodiment of the invention, the piston rod is screwed into the piston-rod pivot bolt by a piston-rod pivot-bolt screw connection. Alternatively or additionally, an axial extension of the pressure tube may be screwed into the pressure-tube pivot bolt by a pressure-tube pivot-bolt screw connection. The axial extension and/or the piston rod are in each case screwed in direction of the mid-axis or longitudinal-axis of the piston/cylinder unit. This affords in a simple way the ability to exactly set the piston/cylinder unit, particularly with regard to a hinge angle between the legs of the hinge, after the installation of the said piston/cylinder unit in the hinge device. To accomplish this, it is merely necessary to screw the piston rod into the piston-rod pivot bolt and/or screw the axial extension of the pressure tube into the pressure-tube pivot bolt by the desired amount according to the desired axial setting of the piston/cylinder unit.

The construction and the capability for the production of the hinge device are further simplified if, according to an embodiment of the invention, the piston-rod pivot-bolt screw connection has in the piston-rod pivot bolt a thread self-tapped by the piston rod and/or the pressure-tube pivot-bolt screw connection has in the pressure-tube pivot bolt a thread self-tapped by the axial extension of the pressure tube.

According to another embodiment of the present invention, the piston-rod pivot bolt or the pressure-tube pivot bolt is pushed and/or latched into a leg-bolt receptacle of the first leg or into a mount-bolt receptacle of the mount. The abovementioned mount-bolt receptacle may be provided if the first leg is arranged in the hinge device fixedly with respect to the mount. Pushing-in and/or latching-in simplifies the mounting of the hinge device and secures the piston/cylinder unit in the device. Pushing-in may take place, for example, laterally in the radial direction, and latching-in may take place, for example, through a slot in the axial direction.

The same applies when, according to another embodiment of the invention, the piston-rod pivot bolt or the pressure-tube pivot bolt is pushed and/or latched into a pivot-bolt receptacle of the second leg. In principle, the piston/cylinder unit may be attached to the first leg (or, if appropriate, the mount) on the piston-rod side and to the second leg on the pressure-tube side, or vice versa.

According to an embodiment of the invention, very small and very large hinge angles can be set if at least one of the leg-bolt receptacle of the second leg and the leg-bolt receptacle of the first leg or the mount-bolt receptacle has a recess which is oriented in the direction of the mid-axis of the piston/cylinder unit and into which the piston rod and/or the axial extension of the pressure tube can engage.

Costs may be lowered and production simplified if, according to another embodiment of the invention, the piston-rod pivot bolt and/or the pressure-tube pivot bolt are made of a plastic. Furthermore, friction and wear can be reduced in this way.

According to another embodiment of the invention, at least one of the legs consists of a plastic, with the result that the leg can be produced in a simple way in one piece with, for example, a leg-bolt receptacle.

It is especially advantageous for a compact construction of the hinge device if, according to another embodiment of the invention, the mount has a water duct, at least partially closing off the hinge device outwardly, of a motor vehicle body. Such a construction is advantageous, in particular, in the case of a hinge device provided for a tailgate and/or rear window of a motor vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 5 is a perspective view of the arrangement according to FIG. 4 with the hinge folded in.

DETAILED DESCRIPTION OF THE PRESENTLY PREFERRED EMBODIMENTS

Figure 1:
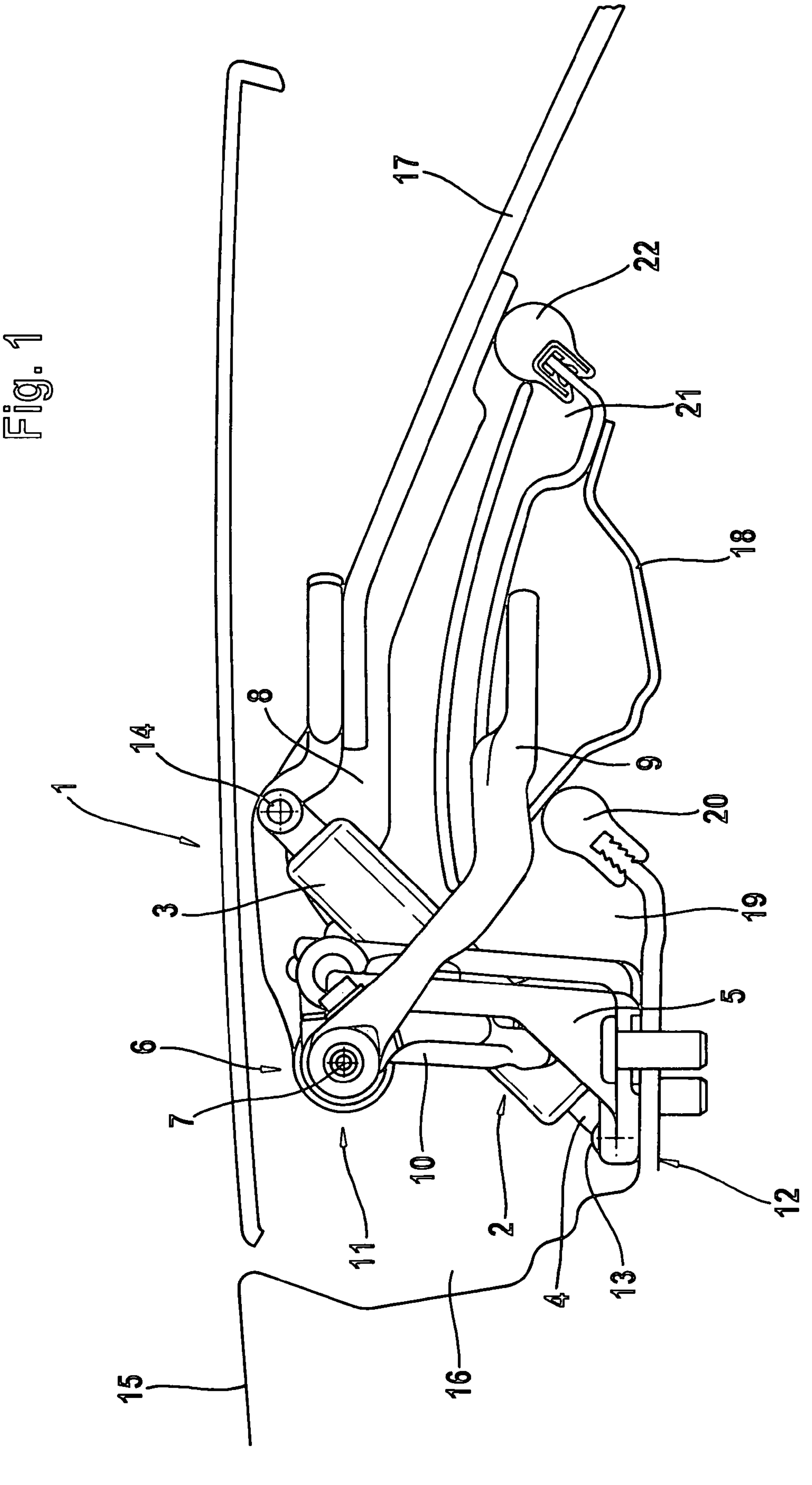
FIG. 1 is a side view of a hinge device according to an embodiment of the present invention.

FIG. 1 shows a hinge device 1 with a piston/cylinder unit 2 which has a pressure tube 3. A piston displaceable in the pressure tube 3 is connected to a piston rod 4. In this exemplary embodiment, the piston/cylinder unit 2 is a compressed-gas pneumatic spring.

The piston/cylinder unit 2 is arranged between a first leg 5 and a second leg 8 of a first hinge 6. The second leg 8 is pivotable with respect to the first leg 5 about a common hinge axis rotation 7 of the first hinge 6. A hinge opening force, that is to say a force increasing the angle between the legs 5, 8, is applied to the legs 5, 8 by the piston/cylinder unit 2. The angle between the legs 5, 8 changes when at least one of the legs 5, 8 is released. Furthermore, a third leg 9 pivotable with respect to the first leg 5 and with respect to the second leg 8 by the piston/cylinder unit 2 is also provided.

A second hinge 11 is formed by the third leg 9 and a fourth leg 10, the hinge axis of rotation of the second hinge 11 coinciding coaxially with the hinge axis of rotation 7 of the first hinge 6. Both the fourth leg 10 of the second hinge 11 and the first leg 5 of the first hinge 6 are fixedly arranged on a mount 12 of the hinge device 1. In the position shown in FIG. 1, the second leg 8 and the third leg 9 are also connectable to one another via a locking means such as, for example, a flap lock. A release of the locking means leads to a release of the first leg 8 and/or of the third leg 9 and consequently to a change in the angles between the legs 5, 8, 9, 10.

The piston/cylinder unit 2 is mounted on the mount 12 by a piston-rod pivot bolt 13 and on the second leg 8 by a pressure-tube pivot bolt 14. The mount 12, which is connected firmly to a roof 15 of a motor vehicle body, not illustrated any further here, has a water duct 16, at least partially closing off the hinge device 1 outwardly, of the motor vehicle body.

Figure 6:
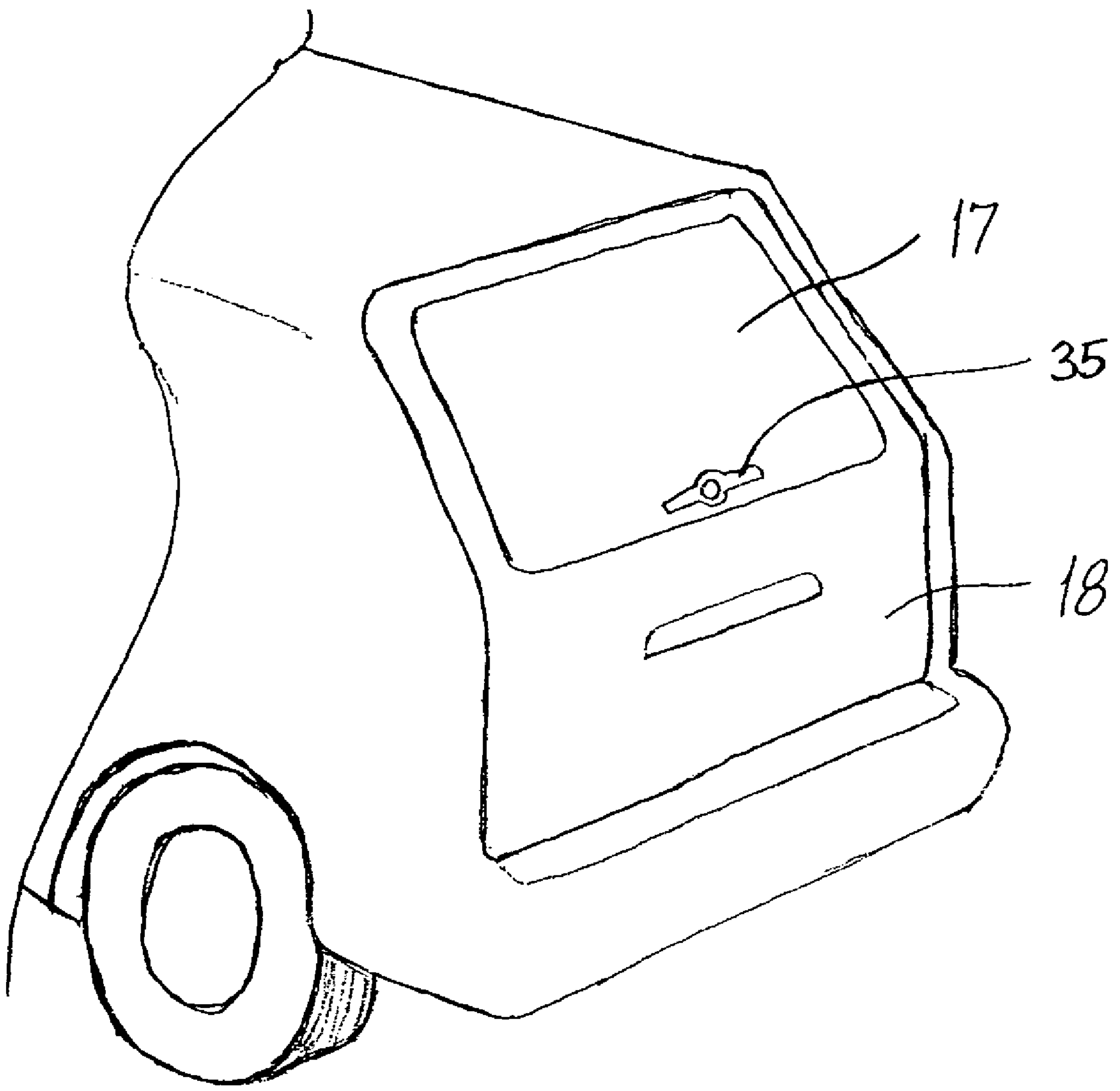
FIG. 6 is a schematic diagram showing the rear end of a vehicle tail gate in which the present invention is implemented.

A rear window 17 of the motor vehicle is connected to the second leg 8, the rear window 17 being arranged in a tailgate 18 of the motor vehicle, the tailgate 18 being connected to the third leg 9 and illustrated only partially here. Furthermore, a drip molding 19 with a sealing bead 20 is arranged on the motor vehicle body for the tailgate 18 and a drip molding 21 with a sealing bead 22 is arranged on the tailgate 18 for the rear window 17. FIG. 6 is a rear view of the tailgate 18 showing the rear window 17 arranged thereon, the rear window 17 being releasably connectable to the tailgate 18 via a locking means such as, for example, a flap lock 35. Accordingly, this lock 35 releasably connects the second leg 8 to the third leg 9. The tailgate 18 may also be connectable to the motor vehicle, thus connecting the third leg to the first leg.

Figure 2:
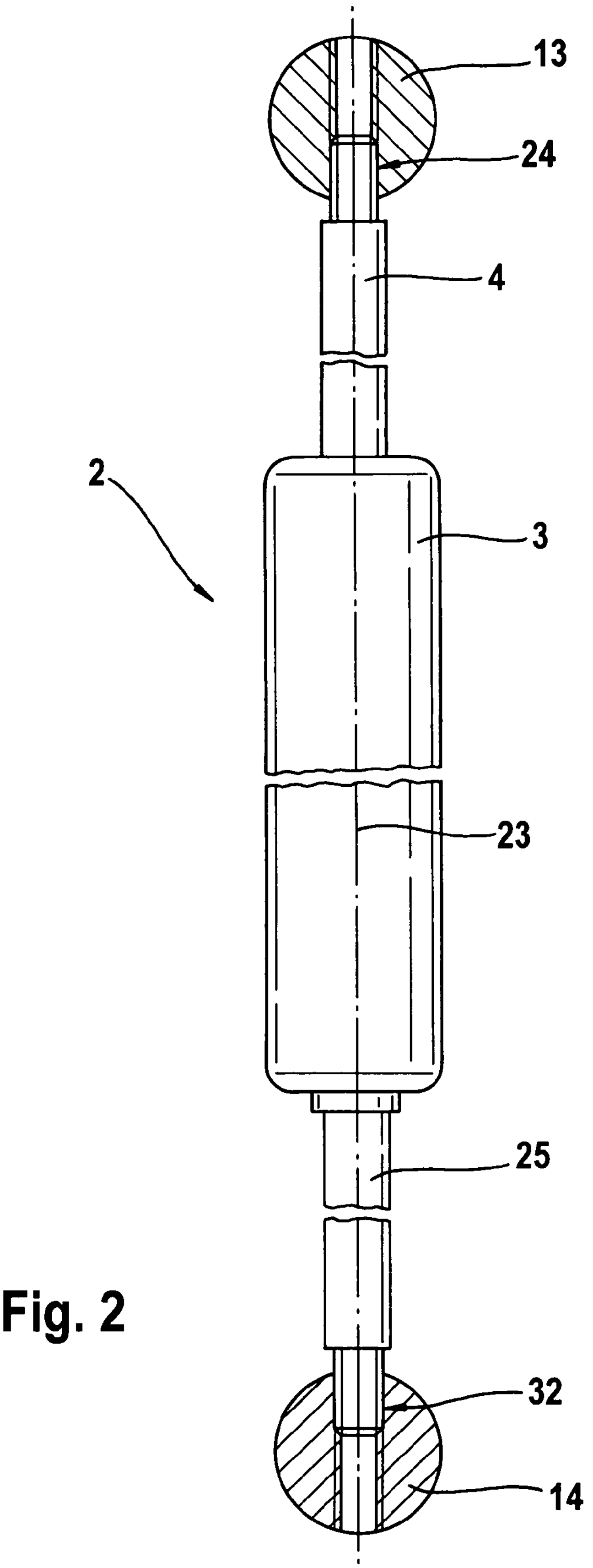
FIG. 2 is a side view of a piston/cylinder unit of the hinge device according to FIG. 1.

FIG. 2 shows the piston/cylinder unit 2 with the pressure tube 3 and piston rod 4 in detail. The piston-rod pivot bolt 13 is arranged on an end of the piston rod 4 facing away from the pressure tube 3. The piston-rod pivot bolt 13 is arranged perpendicularly with respect to the longitudinal mid-axis 23 of the piston/cylinder unit 2. The piston rod 4 is screwed into the piston-rod pivot bolt 13 by a piston rod pivot-bolt screw connection 24 in the direction of the mid-axis 23 of the piston/cylinder unit 2.

The pressure-tube pivot bolt 14 is arranged at the end of pressure tube 3 facing away from the piston rod 4. The pressure-tube pivot bolt 14 is arranged perpendicularly with respect to the mid-axis 23 of the piston/cylinder unit 2. An axial extension 25 of the pressure tube 3 is screwed into the pressure-tube pivot bolt 14 by a pressure-tube pivot-bolt screw connection 32 in the direction of the mid-axis 23 of the piston/cylinder unit 2. The piston/cylinder unit 2 can be fitted accurately into the hinge device 1 by adjusting the position of the piston-rod pivot bolt 13 and/or the pressure-tube pivot bolt 14 using the piston-rod pivot-bolt screw connection 24 and the pressure-tube pivot-bolt screw connection 32.

Figure 3:
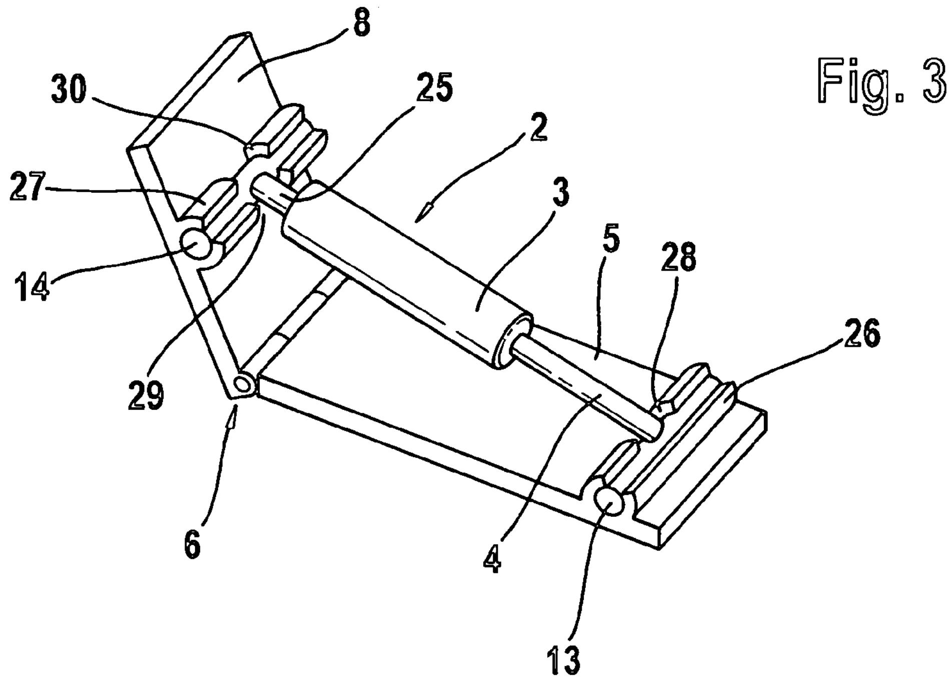
FIG. 3 is a perspective view of the piston/cylinder unit with a first leg and with a second leg of the hinge device according to FIG. 1.

In a further-simplified illustration, FIG. 3 shows the piston/cylinder unit 2 between the first leg 5 and the second leg 8 of the first hinge 6. In this case, illustrated in simplified form, the piston-rod pivot-bolt 13 is not attached directly to the mount 12, but is pushed into a leg-bolt receptacle 26 of the first leg 5. The pressure-tube pivot bolt 14 is pushed into a leg-bolt receptacle 27 of the second leg 8. The leg-bolt receptacles 26, 27 have in each case recesses 28, 29, 30 which are oriented in the direction of the mid-axis for the piston/cylinder unit 2 and into which the piston rod 4 and the axial extension 25 of the pressure tube 3 can enter or engage.

Figure 4:
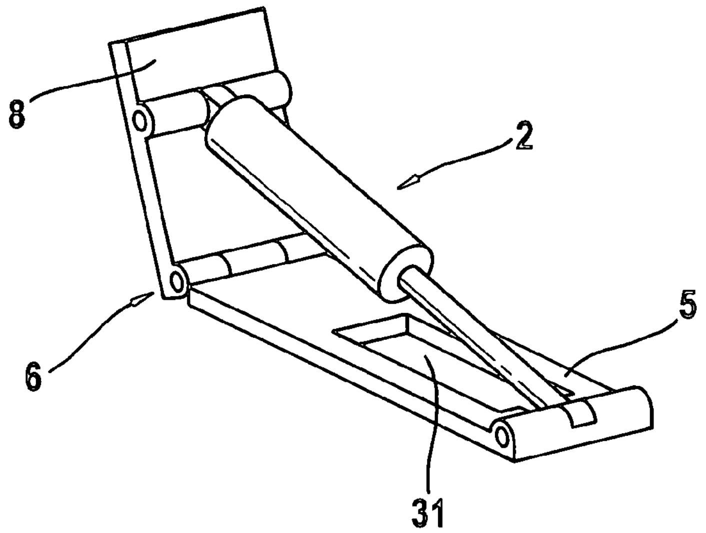
FIG. 4 is a perspective view of another arrangement of a piston/cylinder unit with a first and a second leg.
Figure 5:
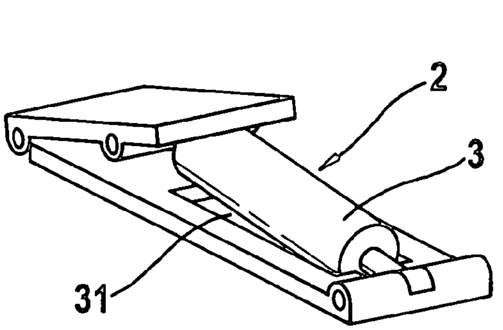

A similar arrangement of a piston/cylinder unit 2 between the first leg 5 and the second leg 8 of a hinge 6 is shown in FIG. 4. The first leg 5 has here a perforation 31 for receiving at least a portion of the piston/cylinder unit 2. As becomes clear from FIG. 5 which shows the hinge 6 in the folded-in position, a pressure tube 3 of the piston/cylinder unit 2 can penetrate partially into the perforation 31, so that the hinge 6 can be folded in to a particularly small angle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hinge device for a flap of a motor vehicle, comprising:

a first leg connectable to a fixed structural part of the motor vehicle;

a second leg pivotably connected to said first leg for pivoting about an axis of rotation and forming a first hinge with said first leg;

a first flap connected second leg and pivotable about said axis of rotation with said second leg;

a piston/cylinder unit comprising a pneumatic spring with a pressure tube and a piston rod connected to a piston axially displaceable in said pressure tube, said piston/cylinder unit having a longitudinal mid-axis and being connected between said first leg and said second leg;

a third leg pivotably arranged for pivoting about said axis of rotation; and a second flap pivotable about said axis of rotation and releasably connectable to said first flap.

2. The hinge device of claim 1, further comprising a fourth leg fixedly connectable to the fixed structural part of the motor vehicle, wherein said third leg and said fourth leg form a second hinge, said axis of rotation being a common hinge axis of rotation of said first hinge and said second hinge.

3. The hinge device of claim 1, wherein said first flap is a rear window and said second flap is a tailgate of a motor vehicle.

4. The hinge device of claim 1, further comprising a lock arranged for releasably connecting said first flap to said second flap.

5. The hinge device of claim 1, wherein at least one of said first, second, and third, legs has a perforation for receiving at least a portion of said piston/cylinder unit.

6. The hinge device of claim 1, wherein said piston rod has a piston-rod pivot bolt arranged perpendicularly with respect to the longitudinal mid-axis of said piston/cylinder unit, at an end of said piston rod facing away from said pressure tube.

7. The hinge device of claim 1, wherein said pressure tube has a pressure-tube pivot bolt arranged perpendicularly with respect to the longitudinal mid-axis of said piston/cylinder unit, at an end of said pressure tube facing away from said piston rod.

8. The hinge device of claim 6, wherein said piston rod is threadably received in said piston-rod pivot bolt by a piston-rod pivot-bolt screw connection in a direction of the longitudinal mid-axis of said piston/cylinder unit.

9. The hinge device of claim 8, wherein said piston-rod pivot-bolt screw connection has in the piston-rod pivot bolt a thread self-tapped by said piston rod.

10. The hinge device of claim 6, wherein said piston-rod pivot bolt is pushed or latched into one of a leg-bolt receptacle of said first leg or a mount-bolt receptacle of a mount connectable to said fixed structural part.

11. The hinge device of claim 10, wherein the one of said piston-rod pivot bolt is one of pushed or latched into a leg-bolt receptacle of said second leg.

12. The hinge device of claim 10, wherein said one of said leg-bolt receptacle of said first leg or said mount-bolt receptacle comprises a recess oriented in the direction of the longitudinal mid-axis of said piston/cylinder unit and into which said piston rod is engageable.

13. The hinge device of claim 11, wherein said leg-bolt receptacle of said second leg has a recess oriented in the direction of the longitudinal mid-axis of said piston/cylinder unit and into which said piston rod is engageable.

14. The hinge device of claim 6, wherein said piston-rod pivot bolt is made of a plastic material.

15. The hinge device of claim 1, wherein at least one of said first, second, and third legs is made of a plastic material.

16. The hinge device of claim 1, further comprising a mount on which said first leg is fixedly connected, said mount having a water duct at least partially closing off the hinge device outwardly of a body of the motor vehicle.

17. The hinge device of claim 7, wherein an axial extension of said pressure tube is threadably received into said pressure-tube pivot bolt by a pressure-tube pivot-bolt screw connection in the direction of the longitudinal mid-axis of said piston/cylinder unit.

18. The hinge device of claim 17, wherein said pressure-tube pivot-bolt screw connection has in said pressure-tube pivot bolt a thread self-tapped by an axial extension of said pressure tube.

19. The hinge device of claim 7, wherein said pressure-tube pivot bolt is pushed or latched into one of a leg-bolt receptacle of said first leg or a mount-bolt receptacle of a mount connectable to said fixed structural part.

20. The hinge device of claim 7, wherein said pressure-tube pivot bolt is pushed or latched into a leg-bolt receptacle of said second leg.

21. The hinge device of claim 19, wherein said one of said leg-bolt receptacle of said first leg or said mount-bolt receptacle has a recess oriented in the direction of the longitudinal mid-axis of said piston/cylinder unit and into which said axial extension of said pressure tube is engageable.

22. The hinge device of claim 20, wherein said leg-bolt receptacle of said second leg has a recess oriented in the direction of the longitudinal mid-axis of said piston/cylinder unit and into which said axial extension of said pressure tube is engageable.

23. The hinge device of claim 7, wherein said pressure-tube pivot bolt is made of a plastic material.

24. The hinge device of claim 6, wherein said pressure tube has a pressure-tube pivot bolt arranged perpendicularly with respect to the longitudinal mid-axis of said piston/cylinder unit, at an end of said pressure tube facing away from said piston rod.

25. The hinge device of claim 24, wherein an axial extension of said pressure tube is threadably received into said pressure-tube pivot bolt by a pressure-tube pivot-bolt screw connection and said piston rod is threadably received in said piston-rod pivot bolt by a piston-rod pivot-bolt screw connection, both in the direction of the longitudinal mid-axis of said piston/cylinder unit.

26. The hinge device of claim 25, wherein said pressure-tube pivot-bolt screw connection has in said pressure-tube pivot bolt a thread self-tapped by an axial extension of said pressure tube and said piston-rod pivot-bolt screw connection has in the piston-rod pivot bolt a thread self-tapped by said piston rod.

27. The hinge device of claim 24, wherein said pressure-tube pivot bolt and said piston-rod pivot bolt are made of a plastic material.

* * * * *